(12) United States Patent
Stone et al.

(10) Patent No.: US 8,601,504 B2
(45) Date of Patent: Dec. 3, 2013

(54) SECURE TRACKING SYSTEM AND METHOD FOR VIDEO PROGRAM CONTENT

(75) Inventors: Chris L. Stone, Hidden Hills, CA (US); Scott Garen, Topanga, CA (US)

(73) Assignee: Verance Corporation, San Diego, CA (US)

( * ) Notice: Subject to any disclaimer, the term of this patent is extended or adjusted under 35 U.S.C. 154(b) by 2883 days.

(21) Appl. No.: 10/600,081

(22) Filed: Jun. 20, 2003

(65) Prior Publication Data
US 2004/0009763 A1 Jan. 15, 2004

Related U.S. Application Data

(60) Provisional application No. 60/390,534, filed on Jun. 20, 2002.

(51) Int. Cl.
*H04H 60/32* (2008.01)
(52) U.S. Cl.
USPC .................. 725/19; 725/9; 725/14; 725/105; 725/109; 380/200
(58) Field of Classification Search
USPC ........... 348/515; 382/100, 232, 251; 380/255; 713/168, 176; 725/105, 109, 112
See application file for complete search history.

(56) References Cited

U.S. PATENT DOCUMENTS

| | | | |
|---|---|---|---|
| 4,230,990 A | 10/1980 | Lert, Jr. et al. | 455/67 |
| 4,454,610 A | 6/1984 | Szikiai | |
| 5,351,304 A | 9/1994 | Yamamoto | 382/5 |
| 5,436,653 A | 7/1995 | Ellis et al. | |
| 5,504,518 A | 4/1996 | Ellis et al. | |
| 5,537,484 A | 7/1996 | Kobayashi | |
| 5,581,658 A | 12/1996 | O'Hagan et al. | |
| 5,613,004 A | 3/1997 | Cooperman et al. | |
| 5,636,292 A | 6/1997 | Rhoads | 382/232 |
| 5,778,108 A | 7/1998 | Coleman, Jr. | |
| 5,850,481 A * | 12/1998 | Rhoads | 382/232 |
| 5,889,868 A * | 3/1999 | Moskowitz et al. | 382/251 |
| 5,960,081 A | 9/1999 | Vynne et al. | 380/10 |
| 6,101,310 A | 8/2000 | Terada et al. | |
| 6,285,774 B1 | 9/2001 | Schumann et al. | 382/100 |
| 6,373,974 B2 | 4/2002 | Zeng | 382/135 |
| 6,400,827 B1 | 6/2002 | Rhoads | 382/100 |
| 6,430,302 B2 | 8/2002 | Rhoads | 382/100 |
| 6,449,367 B2 | 9/2002 | Van Wie et al. | 380/232 |
| 6,487,301 B1* | 11/2002 | Zhao | 382/100 |
| 6,505,160 B1* | 1/2003 | Levy et al. | 725/112 |
| 6,530,021 B1 | 3/2003 | Epstein et al. | 713/176 |
| 6,574,350 B1 | 6/2003 | Rhoads et al. | 382/100 |
| 6,590,997 B2 | 7/2003 | Rhoads | 382/100 |
| 6,614,914 B1 | 9/2003 | Rhoads et al. | 381/100 |
| 6,618,484 B1 | 9/2003 | Van Wie et al. | 380/232 |
| 6,647,128 B1 | 11/2003 | Rhoads | 382/100 |
| 6,678,389 B1 | 1/2004 | Sun et al. | 382/100 |
| 6,681,029 B1 | 1/2004 | Rhoads | |
| 6,700,990 B1 | 3/2004 | Rhoads | 382/100 |

(Continued)

*Primary Examiner* — Jeremy Duffield
(74) *Attorney, Agent, or Firm* — Perkins Coie LLP; Donald L. Wenskay

(57) ABSTRACT

A secure tracking system for video program content places a special code (watermark) within the broadcast program, preferably via the user bits of the SMPTE time code already used on virtually all film and video production systems. A registering authority provides proof of a program broadcast by detecting watermarking and fingerprinting on various broadcast media around the world and reporting it back to a central database.

35 Claims, 4 Drawing Sheets

Overview of Process

(56) References Cited

U.S. PATENT DOCUMENTS

| | | |
|---|---|---|
| 6,785,815 B1 * | 8/2004 | Serret-Avila et al. ......... 713/176 |
| 6,829,368 B2 * | 12/2004 | Meyer et al. ................. 382/100 |
| 6,880,082 B2 * | 4/2005 | Ohta ............................ 713/168 |
| 6,912,010 B2 * | 6/2005 | Baker et al. .................. 348/515 |
| 6,915,422 B1 * | 7/2005 | Nakamura ....................... 726/3 |
| 7,020,304 B2 * | 3/2006 | Alattar et al. ................ 382/100 |
| 7,058,815 B2 * | 6/2006 | Morin ........................... 713/176 |
| 7,162,642 B2 * | 1/2007 | Schumann et al. ........... 713/176 |
| 7,289,643 B2 * | 10/2007 | Brunk et al. .................. 382/100 |
| 2002/0054089 A1 * | 5/2002 | Nicholas et al. ............... 345/745 |
| 2002/0080964 A1 * | 6/2002 | Stone et al. ................... 380/255 |
| 2002/0126872 A1 * | 9/2002 | Brunk et al. .................. 382/100 |
| 2002/0138734 A1 | 9/2002 | David et al. |
| 2002/0154144 A1 | 10/2002 | Lofgren et al. |
| 2003/0012403 A1 | 1/2003 | Rhoads et al. |
| 2003/0021441 A1 | 1/2003 | Levy et al. |
| 2003/0028796 A1 | 2/2003 | Roberts et al. |
| 2004/0078575 A1 | 4/2004 | Morten et al. |
| 2004/0091111 A1 | 5/2004 | Levy et al. |

* cited by examiner

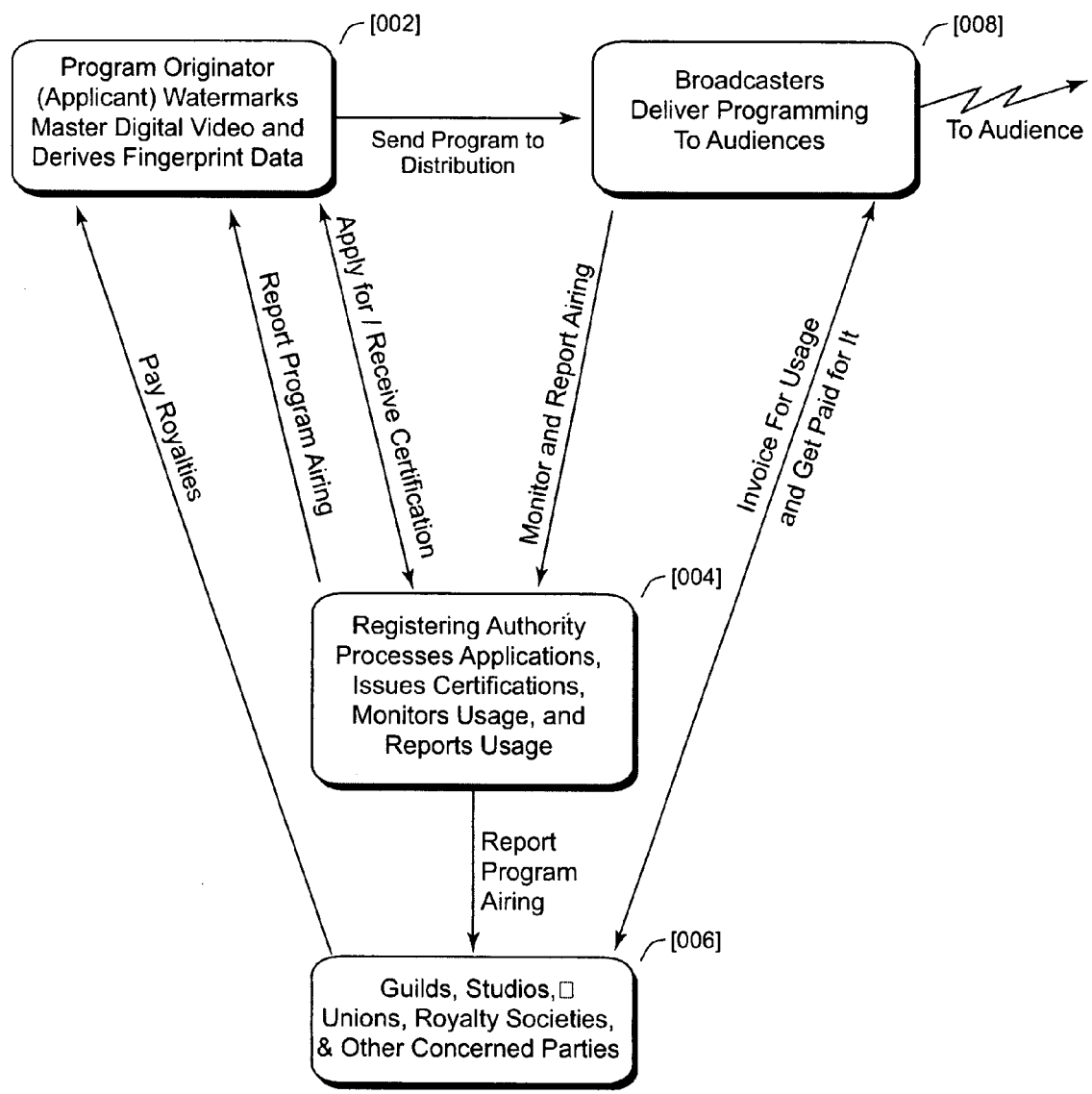
Figure 1. Overview of Process

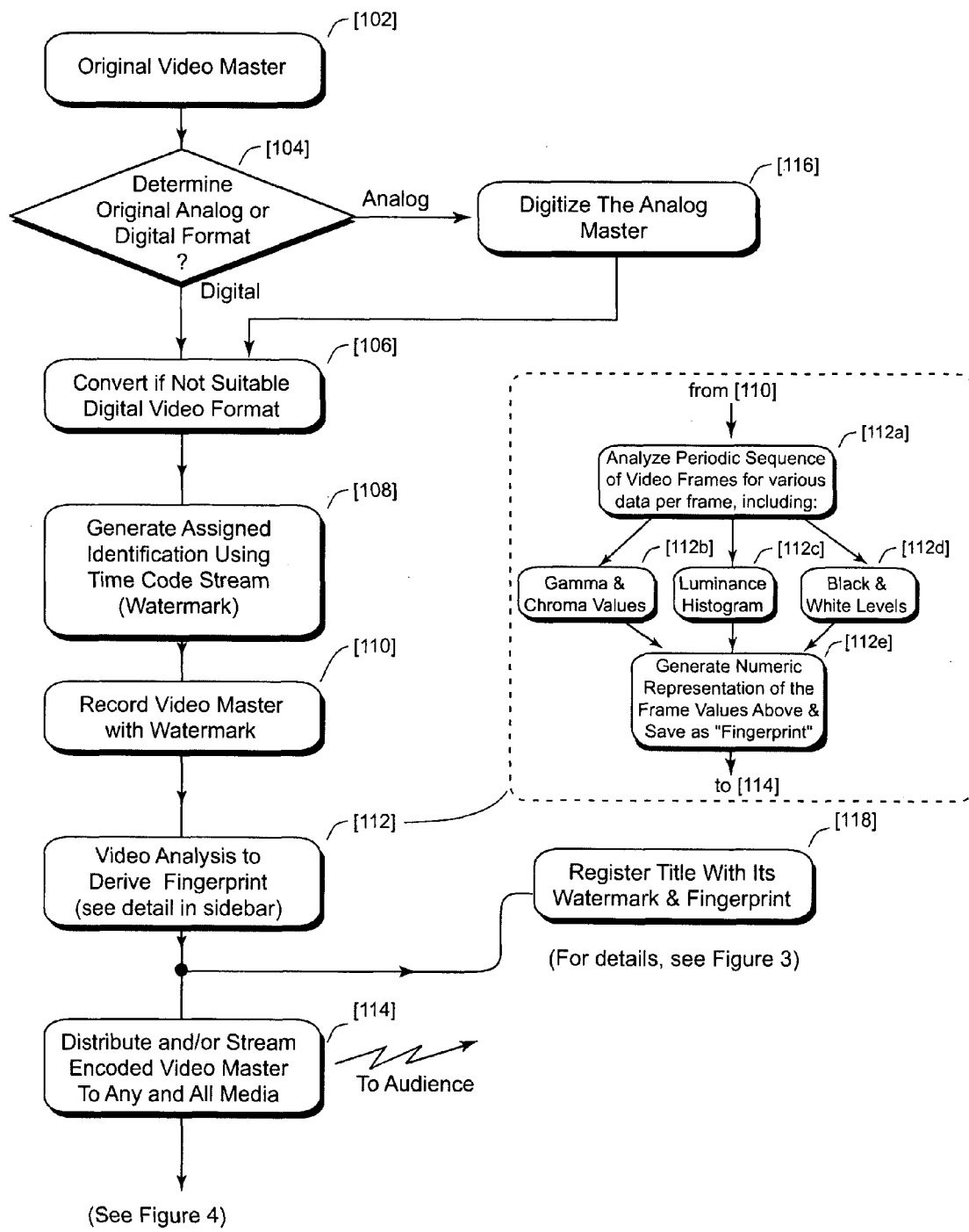
Figure 2. Watermark And Fingerprint Process

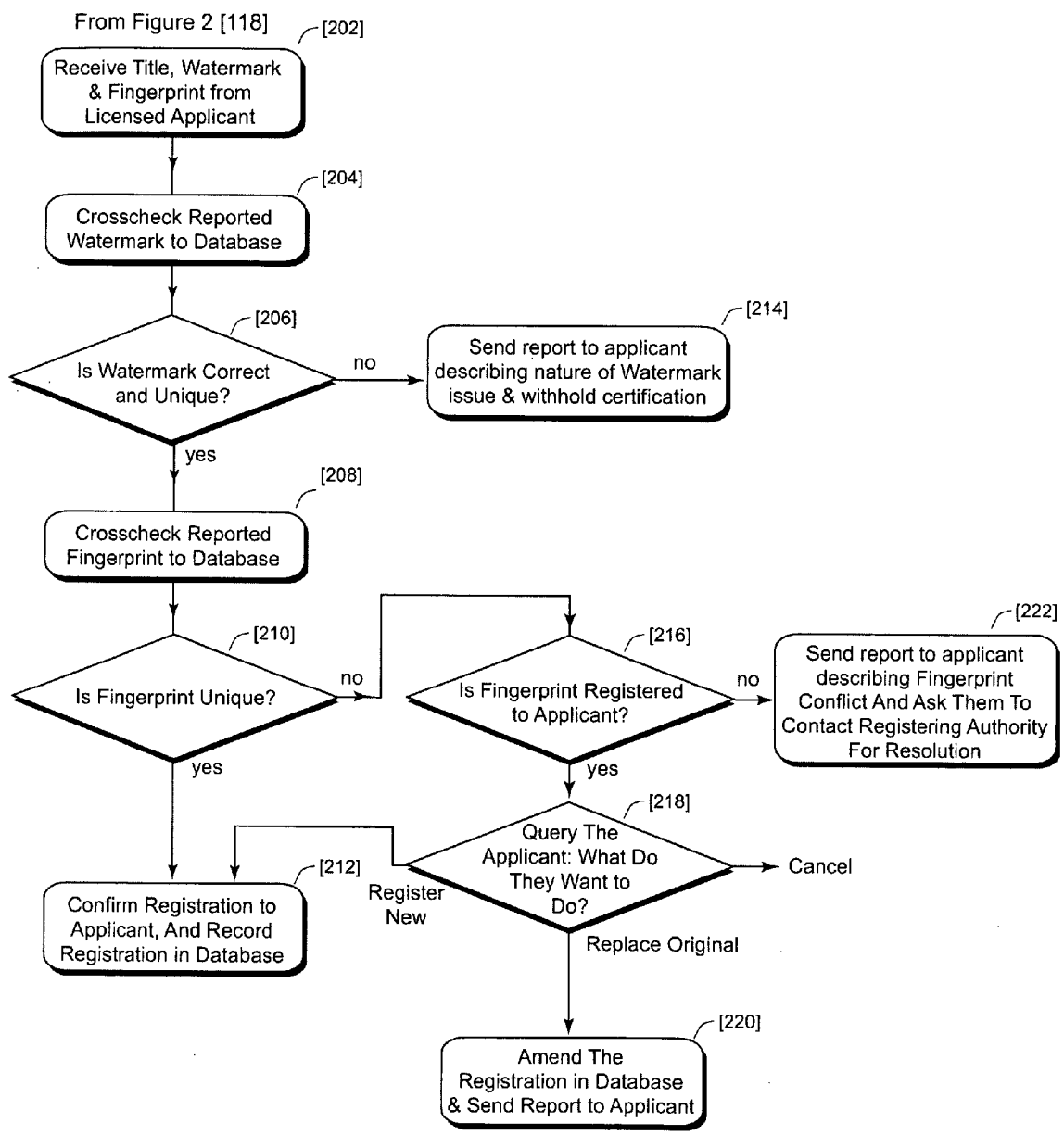
Figure 3. Registration & Authentication Process

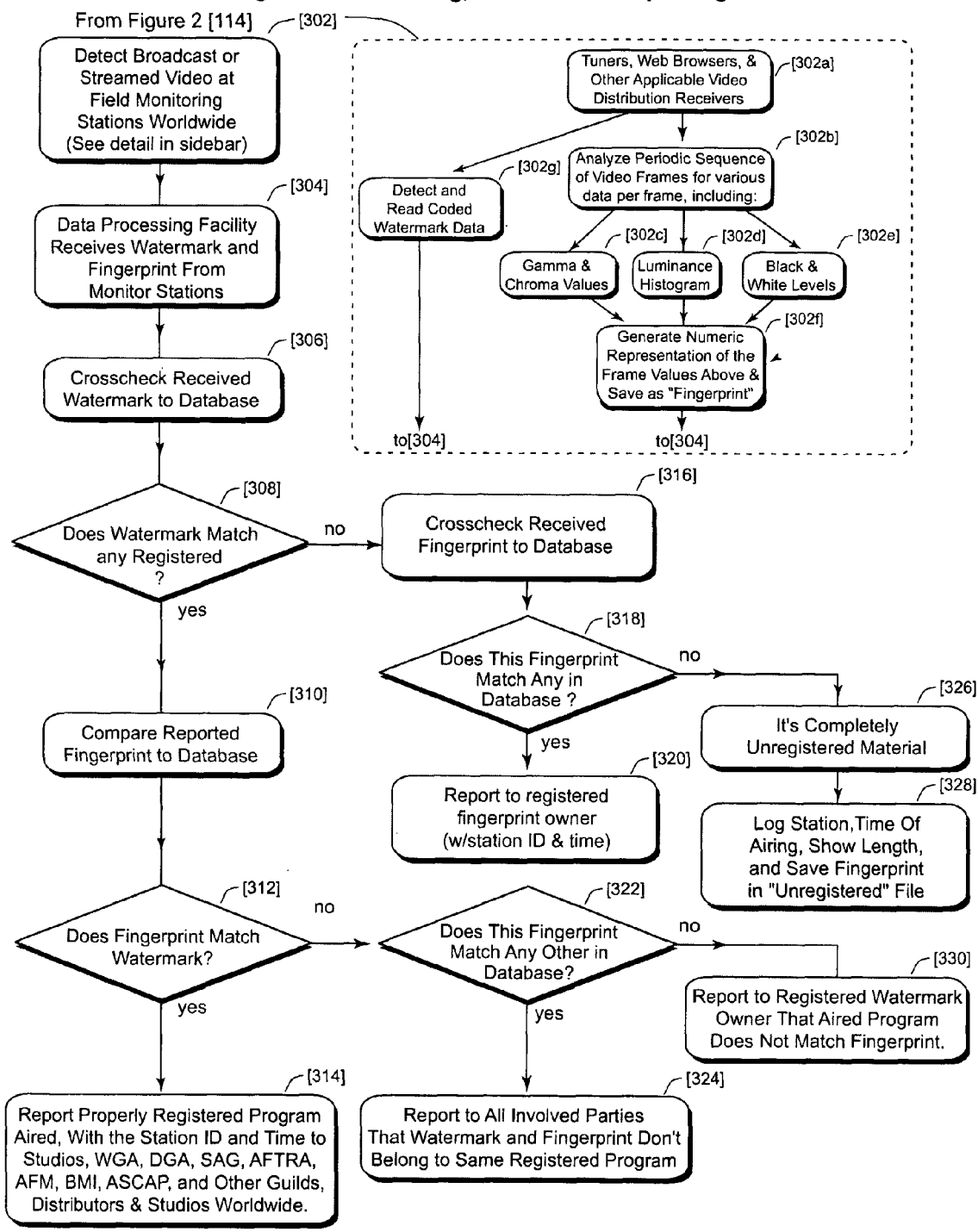
Figure 4. Monitoring, Detection & Reporting Process

SECURE TRACKING SYSTEM AND METHOD FOR VIDEO PROGRAM CONTENT

REFERENCE TO EARLIER APPLICATION

This application claims the benefit of provisional patent application No. 60/390,534 to Stone and Garen, filed Jun. 20, 2002.

FIELD OF INVENTION

This invention relates to the detection of copyrighted video material and reporting of its usage to the owners of the copyrights and other interested parties. Specifically, it involves a new method of identifying original material at the point of origin, positively identifying it after it has been distributed through common distribution media (broadcast, cable, internet and so forth), and reporting the time and date of use, as well as possible discrepancies (alteration or attempted obliteration of identification), to the interested parties so that appropriate royalties can be collected and/or distributed, and so that possible legal action may be taken where appropriate.

DESCRIPTION OF RELATED ART

The explosive demand for cable TV and direct satellite system (DSS) TV production programming has made it increasingly difficult to keep track of airplay around the world. The Internet's approaching ability to air TV directly opens up an even wider issue of pirating, airing without permission, and something called "stripping" (more detail later.) The dilemma is: how do producers, directors, composers, and all artists connected to royalty-based salaries get paid? Each creative category has its own royalty collection agency. The way royalty payments work today is that the networks and cable companies (referred to herein as "broadcasters") receive income from their advertisers (and subscribers). Each royalty collection agency negotiates a separate fee on behalf of their members with each individual broadcaster annually. There is a process for calculating the number of artists entitled to royalties, versus advertising dollar shares. This process is called blanket licensing, and collectively, these blanket licenses add up hundreds of millions of dollars every year. In theory, these negotiated sums represent the balance between the number of hours of creativity aired, versus the broadcasters' annual revenue (primarily for advertising). Since advertising dollars change every year, and the number of artists change, annual royalty rates (distributions per program unit aired) will vary.

Royalty collection agencies have been looking for ways to increase their efficiency by automating their monitoring of the "air waves," which include conventional land-based transmitters, satellite broadcasts, closed circuit "CATV" (cable) and ultimately internet streaming media. The two basic methods under strong consideration can be classified generally as "fingerprinting" and "watermarking".

Watermarking is the imprinting of a unique identification code within the program material. In the past, this has been done in the audio of film and video distributed programs with a unique pattern of very narrow "holes" in the audio spectrum, which are filled with digital or analog numerical sequences that ostensibly are not audible but are detectable by special electronic scanning.

Fingerprinting is a computer-assisted process that compares aired program material to material that is already classified and stored in a database; when a match is made, the program owner is paid. A potential drawback of conventional fingerprinting is that the large amount of computer processing and "number crunching" power (and elapsed time) necessary to detect and crosscheck reported usage against a database of fingerprints.

A potential problem of watermarking alone is that it may alter the nature of the broadcast signal in a way that requires special Federal Communications Commission (FCC) approval. A potential problem of fingerprinting as it has been proposed involves the encoding of actual video frames for reporting to the registering authority; if any portion of a program is copied and retransmitted, this infringes on mechanical royalty rights in and of itself, and the data in compressed video frames can itself be pirated (i.e., a still photo from a frame of a motion picture or TV show).

SUMMARY OF THE INVENTION

A secure tracking system for video program content is presented which overcomes the problems noted above. The system goes beyond watermarking and adds a sophisticated fingerprinting of the video program which, together, makes discrepancies very easy to automatically detect, and thus goes a long way toward detecting pirated material while facilitating accurate and complete reporting of program usage.

The present system places a special code (watermark) within the broadcast program. The Society of Motion Picture and Television Engineers (SMPTE) has a FCC-approved standard time code that already is used on virtually all film and video production systems, and for on-air broadcasting as well. The time code stream includes data bits which are reserved for use by the user—i.e., "user bits". The present system preferably places its watermark in the reserved user bits of the existing time code stream.

Using the system proposed herein, a registering authority could provide proof of a program broadcast, 24 hours a day, 7 days a week, worldwide, across multiple media, by detecting watermarking and fingerprinting on various broadcast media around the world and reporting it back to a central database. Subsequently every royalty collection agency could quickly assess usage and determine royalties to be collected and paid out. The registering authority could exact a commission for this service from the royalty collection agencies, as well as from other subscribers among the general public.

It is estimated that 60% to 70% of all TV broadcasts around the world are not being accounted for. This translates into tens of millions of dollars in lost revenue every year. A major need for this kind of registration and program airing detection occurs outside the USA., where station logs upon which royalty payments are based are rarely provided. Collecting foreign distribution payments is always difficult, because while the U.S. has laws that mandate disclosure of broadcast station logs to the public, most other countries do not. Station logs are widely used by the royalty companies to determine what has aired in the USA, and even so only about three-quarters of all shows are reported. In South America less than half the shows are reported. The present system exploits this previously untapped source of legitimate revenues for program owners, and allows program owners to close the gap between program usage and royalty payment.

Further features and advantages of the invention will be apparent to those skilled in the art from the following detailed description, taken together with the accompanying drawings.

BRIEF DESCRIPTION OF THE DRAWINGS

FIG. 1 is a diagram which presents an overview of the a process which employs the present secure tracking system FIG. 2 is a flow chart which illustrates a watermark and fingerprint process in accordance with the present invention.

FIG. 3 is a flow chart which illustrates a registration and authentication process in accordance with the present invention.

FIG. 4 is a flow chart which illustrates a monitoring, detection and reporting process in accordance with the present invention.

DETAILED DESCRIPTION OF THE INVENTION

There are many ways to devise and apply a unique watermark to a program. Use of the SMPTE time code is preferred, though the invention is not limited to use with this code—other data streams in use on present programming, or which could be devised, including (but not limited to) a program's embedded audio data stream, might also be employed to carry the unique watermark. Some fifty years ago, the SMPTE designed an encrypted sub-code that piggybacks on SMPTE time code, referred to herein as the "user bits." User bits are accessed through a special window on a time code generator, or through specialized computer software in the case of digital video, and can be set before generating time code. Traditionally, user bits are a static number that is continuously generated while SMPTE code is running. The user bits cannot be changed unless one erases the SMPTE code entirely and prints new code. User bits are not seen unless one knows how to display them. Even so, they are always printed with the regular SMPTE code, even if they are not set to any particular value (today they are usually zeroes or gibberish).

The user bits are an 8-bit hexadecimal code; the maximum user bit number is FFFFFFFF, which has a decimal value of about 4.3 billion. This should be more than adequate to provide unique registration numbers for all program material for many years.

A special type of SMPTE timed code called Vertical Interval Time Code (VITC) goes directly onto video programming through the vertical interval synch signal. The vertical interval synch signal tells the picture when to move onto the next frame. VITC is neither seen nor heard unless decoded by a VITC SMPTE reader. The VITC user bits can be used to contain the watermark as described herein, and, especially when combined with fingerprinting (as described below), makes it much more difficult to defeat the watermarking though various means of obfuscation or concealment.

FIG. 1—Overview of Process

In a typical sequence of events which employs the present secure tracking system, the originator of a film or video project who has contracted with the registering authority takes a newly created program and submits it for registration certification 002. This entails processing the program to watermark and fingerprint it, and submitting an application which includes title, ownership and various other data. It can be submitted from, e.g., the production company, from a studio, from a post production house, or from a closed captioning facility, among other entities. The registering authority processes the application, checking it for correct formatting, lack of conflict with previously registered programming, and if all is in order it issues a certification back to the applicant 004.

The applicant 002 then sends the registered program to distribution, which generally speaking is the broadcasters 008 (while this could be done prior to registration, no reporting or protection would be assured).

The broadcasters then air the material, and the registering authority 004 or its contracted agents monitor all broadcasts; they detect encoded watermarks and fingerprints, and report usage to those who are due royalties 006, as well as to other subscribers to this information. Those who collect royalties then invoice the broadcasters 008, and receive payment from them, and they distribute payments to the program copyright owners 002.

Note that the steps described and shown in FIGS. 1-4 are merely exemplary—the precise details of each step, the sequence of steps, and the entity performing the steps may differ from that described here without departing from the essence of the invention.

FIG. 2—Watermark and Fingerprint Process

For the purpose of making it easier to explain, the process is divided into three phases, all of which are actually ongoing. Each phase is represented by its own figure (FIGS. 2, 3 and 4, respectively).

The production company or other program owner/originator will examine their original video master program 102 to determine whether it is in an analog format such as motion picture film or conventional video, or a digital format 104. Digital formats include such things as digitally coded video tape, film or analog tape transferred to computers through frame-grabbing/digitizing methods, or even scanned and digitized analog film frames. If the program is in an analog format (104=Analog), then it must be converted to a digital format 116 at this stage for subsequent analysis, although the original program can be maintained and distributed in analog format if so desired. If it is already digital (104=Digital), then it may have to be converted to a suitable digital format 106 for compatibility with this process. The digital video master is then assigned a unique numerical code (watermark), which is preferably programmed into the user bits portion of SMPTE time code 108. This is a desirable method because it is an industry standard with over 4 billion unique values. However other watermark numbering methods may be used without changing the nature of the present process. Each production company participating could be assigned a block of master code numbers as part of their contract with the registering authority, and they would be responsible for selecting one of them and assigning it to a given program at this point. As an alternative to programming the watermark into the SMPTE time code, the watermark could be encoded into an embedded audio data stream.

The coded (watermarked) program is now recorded as a fresh, encoded video master 110.

Now the program is fed to a computer at the production company, or other facility, which contains suitable video input/output ports and proprietary software that analyzes video frames to derive a simplified numeric representation of each frame 112. This is a key step in establishing a fingerprint which is easy to convey to the registering authority's master data processing and storage facility in a highly compressed fashion. Depending on how much the production company wishes to spend, they can use a very powerful, high-speed computer with add-in accelerator circuitry to make this fingerprinting process real-time (or close to it), or they can allow the process to run more slowly and save on hardware costs. It doesn't matter here because this step only occurs once, at the conclusion of the production of the program.

The actual process whereby the fingerprint is derived involves analysis of a series of video frames 112*a*. Ideally, all the content of all the frames is fingerprinted. However, the sheer amount of data involved makes this very time consuming, and further at the other end the process—detection and monitoring—it makes searching much slower. Thus, since it would be impractical to fingerprint every frame using present day computers and data transmission methods, a subset of frames (for example, one frame in 30, or one frame per second) could be fingerprinted instead and the data can be distilled so that something other than full video is reported as the fingerprint. The distillation process preferably proceeds as follows: each analyzed frame will be measured for specific video values such as gamma and chroma 112b, luminance 112c with a resolution sufficient to create a histogram, and black level/white level 112d. These analyses are reduced to relatively small numerical values 112e such that the fingerprinted representation of a minute of program will be compressed by a factor of several thousand to one. This is a major improvement over merely digitizing and conveying complete video and audio material for that amount of program material (in comparison, even today's popular video compression algorithms will deliver ratios in tens to perhaps a hundred to one).

The production company computer would typically read the production company's self-assigned watermark number (from their licensed block of numbers), and (at the production company's initiation) send a formatted file to the registering authority 118. This file will contain the fingerprint data, watermark, and basic information entered by the production company such as program title, ownership, and so forth. It will comprise a request for ownership certification.

At this point, or even before this point, the production company may distribute the program, but they will not be assured of reporting and distribution until the registering authority has examined the submission and issued a certification. The submission and certification transactions would preferably occur over conventional high-speed internet data paths, but other equivalent means (such as CD ROM shipment) would certainly be acceptable, though slower.

FIG. 3—Registration and Authentication Process

When the registering authority receives a submission from one of its licensees requesting registration of a new program 202, they would typically perform a series of steps to verify that the program has not been previously registered, and that the submission is correctly formatted using a duly assigned and unique registration code.

The first step after logging receipt of a submission is to crosscheck the reported watermark to the database 204. The system typically looks to see if the watermark number is within the range of numbers assigned to the licensee, and if so, whether that number has already been used by this licensee for previously registered material 206. If the watermark does not pass this initial test (206=no), a report is preferably sent to the applicant describing the nature of the problem 214, and the registration process is suspended until the issue is resolved. If the watermark passes this test (206=yes), then the submitted fingerprint data is compared to the database 208. Because this is a fairly small amount of data (perhaps a few megabytes), rather than the gigabyte plus of a full program, high-speed, optimized computers could be used to perform the comparison.

If the fingerprint is not unique (210=no), then the registering authority would typically examine who owns the registered fingerprint, specifically whether it is the applicant 216. If the fingerprint is registered to the applicant, it may mean that part or all of the program has been used before. In this case, the registering authority queries the owner/applicant to find out if this is an unintentional re-registration, in which case the application is canceled (218=Cancel). Or, the registering authority may find that the applicant has made edits and wishes to replace the registered show with this one (218=Replace), in which case the registration is amended and a report sent to the applicant 220. Or, the owner may wish to register this as a completely new show (218=Register New), in which case registration continues as in 210=yes. (Some shows are edited just prior to airing, and so they may have just been registered, and yet now have to be replaced with the final version.) If the fingerprint is registered by someone other than the applicant (216=no), then there is the possiblity of a conflict. Maybe the applicant has licensed parts of the program or the whole program, maybe there is an error, maybe there is theft of material. In this case, the registering authority would typically send a report to the applicant describing the nature of the fingerprint conflict and ask them to contact the registering authority to resolve the issue, suspending the application (at least temporarily) 222. This discourages spliced-up, watermark-replaced pirating while allowing for legitimate cross-licensing of programs or parts thereof.

If the fingerprint is unique 210=yes, then the registering authority certifies the submission and confirms registration to the applicant, as it also enters this registration in its database 212.

FIG. 4—Monitoring, Detection, and Reporting Process

Field monitoring stations around the world receive broadcast (e.g., VHF, UHF, Satellite, CATV) and streamed video 302. The process, in detail, involves use of conventional tuners, cable decoders, web browsers, and other applicable program detection means (as technology advances and changes), connected to computers and related automated equipment 302a. Programming is examined for a watermark, and if detected, the watermark is extracted 302g. The video frames are analyzed 302b for the same data used in the original fingerprinting process (302c, 302d, 302e), and these values are reduced to a numeric fingerprint 302f. It may be possible to use only one or a few of these techniques; the actual fingerpint method is not as critical as is its ability to be derived quickly, to be highly compressed, to be difficult to obscure through video contrast/brightness/color manipulation, and its reliability. The full duration of the program is preferably analyzed, so that if anything has been cut, spliced in, or otherwise scrambled in sequence, the subsequent comparison with the database will still be able to find protected fragments.

The analysis of each program is sent to the registering authority's data processing center, preferably via conventional high-speed data networks 304. Here, the process that occurs is similar to that in FIG. 3, where the program is checked for ownership, but there are differences. The first step is to crosscheck the detected watermark against the database 306. If it does not match any registered program (308=no), then it could simply be unregistered material, or it could be material which is protected but has had the watermark altered or stripped off. To check this, the reported fingerprint is compared to the database 316. If it does not match anything (318=no), then neither the watermark nor fingerprint is a match and this is completely unregistered programming 326. It is possible that in the future an owner, will opt to register this program, and so the registering authority preferably logs information about it, including the fingerprint, in an "unregistered" database 328. Should an owner subsequently register that program, the owner can ask the registering authority to search for airings and can then attempt to collect royalties retroactively. However, if the fingerprint check turns up a match (318=yes), then it is apparent that the original program has been altered. Reports are preferably sent to the registered fingerprint owner and to the registered watermark owner indicating the nature of the problem, and including the station identification, location, and time of program airing 320. This allows the concerned parties to take appropriate action. Note that previously, there has been no way to effectively detect such probable mis-use of copyrighted material, and either the owner of the material is not paid, is paid inappropriately, or someone other than the owner is paid. Using the present system, no royalty will be paid until the apparent dispute can be resolved by the now notified parties.

When the detected Watermark does match a Registration (308=yes), the registering authority should still compare the fingerprint to the database 310, but subsequent actions will be different than if 308=no. The registering authority checks to see if the fingerprint and watermark match; i.e., are registered to the same program. If not (312=no), then there is a problem, but its nature is not yet known, so the registering authority does a further check to see if the fingerprint matches any other in the database 322. This takes a bit longer than the check against a presumed "known" program as tagged by the watermark if 312=yes, because now the registering authority has to examine their entire fingerprint database. If 322=no, the registering authority has a situation where the watermark is somehow coded on unregistered material, and so they preferably report this to the registered watermark owner 330. It is unlikely that any royalties would be paid in this case.

If the fingerprint (or parts of the show's fingerprint) matches something in the database (322=yes), then there is a mismatch of registrations and an apparent problem. Reports are preferably issued to all concerned parties 324, with the nature of the problem, station ID, location and time, and until this can be resolved no royalties are likely be paid.

If the fingerprint and watermark do match (312=yes), then the program is qualified for royalty payment and reports are sent to the registered program owners and interested guilds. This would typically be such organizatoons as the Writers Guild of America, Directors Guild of America, Screen Actors Guild, American Federation of Radio & Television Artists, American Federation of Musicians, Broadcast Music Inc, American Society of Composers Authors and Publishers, as well as other guilds, studios, and distributors wherever they may be.

In accordance with the present system, no actual video is re-transmitted over the phone lines, data network or worldwide web to the central database; this would involve the FCC or similar regulatory agencies around the globe. The present system turns the watermark and fingerprint for each show into one single numerical data block which costs the producer/broadcaster almost nothing to encode. Further protection against mischief could be provided during the actual registration process and during field monitoring reporting by using Versign or similar key-encoded encryption during the transmission of the data.

After data compression, the sampled frames from an entire show can be quickly transmitted to the central database just as the show completes its airing. The watermark values tell the database where to start looking for fingerprint comparisons. Without specific time-referenced watermarking, any other fingerprinting system would need to look through every single part of every file for every single show each time—a very slow process.

Once a show airing report is formally logged into the central database, subscribers could log onto the world wide web and get real-time confirmation of everything aired all over the world. This central database could be accessible using industry standard web browsers. Today, this kind of information normally arrives at the royalty companies in upwards of six months to a year, if at all. With this new form of registration and monitoring, the reporting can be immediate.

Aside from comprehensiveness, accuracy and speed of reporting, the present system will essentially defeat those who would seek to divert royalty payments through a process know as stripping. Stripping describes the unlawful removal of a soundtrack from a given show, replacing it with another soundtrack. This is done by people who wish to file a new music cue sheet under a different name, typically with a foreign entity as owner, and then collect royalties for its use from a non U.S.-based agency. Since currently royalties are paid based on cue sheet reporting, strippers are often able to get away with this illegal theft, and losses to copyright owners are estimated to exceed tens of millions of dollars annually worldwide. Because the present system would still be able to detect and report on the fingerprinted video portion of a stripped program, legal owners of the copyrights would be able to submit bills to those who have aired such programs, and the strippers would be thwarted. As it is right now, most of the legal owners have no way to detect the airing of stripped programs, as it would take human "watchers" all over the world to meticulously discover re-named, dubbed, soundtrack-replaced video content. Even once discovered, the process of prevailing and demonstrating proof of ownership to foreign courts may make it economically unfeasible to collect at all.

Conclusions

The system presented here provides a comprehensive means of registering, monitoring and reporting on most forms of copyrighted broadcast media (broadcast being used in the broadest sense). Unlike previous methods, it is able to detect all common forms of program alteration and still be able to report to the owners of the material that their program has been aired, whether intact or not. Because it does not rely upon station-submitted cue sheets, but rather upon automated monitoring and reporting systems, it will "catch" most of the lost royalty opportunities that currently slip through the sieve of underreporting, non-reporting, stripping, and failure of human "listeners" to catch problems.

This system uses a highly tamper-resistant system which combines fingerprinting and watermarking.

Even when the program has been altered, the registering authority can notify Guilds (and other subscribers) of the specific time and station information during which an unregistered program aired. The Guilds can then check to see if they expected a covered program to be aired, and they can determine whether and why there is a discrepancy and possible royalty evasion (or breach of advertising contract).

If the registration number is valid but the fingerprint (selected frames) does not match, then the registering authority can notify the Guilds, authors and advertisers of an apparent breach of registration.

Changes in color balance, contrast, and even wholesale splicing and rearranging of scenes or intermixing material from multiple original programs will not avert detection, since the means of encoding and detecting are able to interate more complex scans if preliminary checking does not show a good match of all factors. The reduction of vast amounts of video data to a very small fraction of that data is a key aspect of this system, which allows for comprehensive and rapid analysis and crosschecking.

The nature of the process lends itself to easy adaptation to various means of program distribution so that as technology evolves, this system will remain viable. For example, fingerprinting stored programs first distributed on black-and-white film can still be used to detect colorized, digitized, streamed programming on the internet.

The methods described herein could also be economically applied to protecting and reporting on short programs such as commercials and shorts. Thus, an actor who appears in a 30-second spot might be more apt to collect all his/her royalties, especially since that actor could subscribe to the registering authority's reports and would not have to rely entirely upon the accounting and reporting practices of studios and agencies. This empowerment of all concerned parties with accurate, complete, and accessible usage data can help ensure fair and equitable sharing in advertising/programming revenues throughout the entertainment business.

The same techniques could also be applied to protect recorded documentation against tampering, and to preserve the integrity of legal records. As an example, surgeries may be videotaped to protect doctors and patients; real-time documentation/registration of such a program would assure that any subsequent distribution or reference to the program could be verified to be complete and unaltered. Similar methods could apply to sensitive manufacturing operations such as for medicines and in food processing plants, where videotaping and the registering authority's certified recordings could serve as court-acceptable proof of this or that (as compared to more readily alterable privately stored tapes without external verification).

While particular embodiments of the invention have been shown and described, numerous variations and alternate embodiments will occur to those skilled in the art. Accordingly, it is intended that the invention be limited only in terms of the appended claims.

We claim:

1. A method of tracking a broadcast program, comprising:
   inserting a unique watermark value into a program to be broadcast;
   deriving a fingerprint value based on said program's content;
   storing said program's watermark value and associated fingerprint value;
   detecting any watermark value inserted in a given broadcast program;
   deriving a fingerprint value based on said given broadcast program's content;
   creating a database in which said unique watermark(s) and their associated derived fingerprint values for a plurality of unique programs to be broadcast are stored;
   registering said unique watermark and associated derived fingerprint value for said program to be broadcast in said database; and
   redundantly identifying said given broadcast program, said redundant identification comprising:
      comparing any detected watermark value with said database of registered watermark values;
      if a detected watermark value matches a registered watermark value from said database of registered watermark values, cross-checking said fingerprint value derived from said given broadcast program against said database of registered fingerprints; and
      if said fingerprint matches a registered fingerprint from said database of registered fingerprints, a first identification information associated with said registered watermark value is compared with a second identification information associated with said registered fingerprint to assess a status of said broadcast program.

2. The method of claim 1, wherein said unique watermark value is written into the user bits of said program's SMPTE time code.

3. The method of claim 1, wherein:
   said program to be broadcast has an associated embedded audio data stream; and
   said unique watermark is encoded into the bits of said program's embedded audio data stream.

4. The method of claim 1, further comprising reporting the results of said cross-checking to a registrant of said program to be broadcast.

5. The method of claim 1, further comprising comparing said fingerprint value derived from said given broadcast program with said stored fingerprint values when said fingerprint value derived from said given broadcast program is different than said stored fingerprint value associated with said stored watermark.

6. A method for enabling reliable identification of a content comprising:
   embedding a watermark value into said content to produce an embedded content;
   generating a fingerprint associated with said content;
   registering information comprising said watermark value and said fingerprint, wherein combination of said registered watermark value and fingerprint are subsequently used to redundantly identify said content, said redundant identification comprising:
      generating a fingerprint associated with a received content;
      analyzing said received content to detect at least one watermark value;
      identifying said received content by comparing said detected watermark value with a database of registered watermark values;
      if said detected watermark value matches a registered watermark value from said database of registered watermark values, said fingerprint is compared with a database of registered fingerprints; and
      if said derived fingerprint matches a registered fingerprint from said database of registered fingerprints, a first identification information associated with said stored watermark value is compared with a second identification information associated with said fingerprint to assess a status of said received content.

7. The method of claim 6, wherein said fingerprint is generated by analyzing inherent characteristics of the content.

8. The method of claim 6, wherein said inherent characteristics comprise at least one of luminance, chroma, gamma, or amplitude levels of the content.

9. The method of claim 6, wherein said fingerprint is generated for at least portions of an audio or video component of said signal.

10. The method of claim 6, wherein said watermark value is embedded in at least portions of an audio or video component of said content.

11. The method of claim 6, wherein said watermark value is inserted into an auxiliary information area of said content.

12. The method of claim 11, wherein said auxiliary information area is reserved for an SMPTE time code.

13. The method of claim 6, wherein said registering comprises:
   receiving information comprising at least said watermark value and said fingerprint at a registration authority; and
   verifying the received information.

14. The method of claim 13, wherein said verifying comprises comparing at least one of said watermark value or said fingerprint against a database of registered watermark values and fingerprints.

15. The method of claim 14, wherein said registering is completed when said comparing produces no matches.

16. The method of claim 14, wherein production of at least one match as a result of said comparing is indicative of an incomplete registration.

17. The method of claim 16, further comprising notifying at least one of an applicant or a content owner.

18. The method of claim 14, wherein, said registering is partially completed when said comparing produces at least one match.

19. The method of claim 18, further comprising:
contacting at least one of an applicant for registration or a content owner; and
updating said database in accordance with the response(s) of said applicant or said content owner.

20. The method of claim 13, further comprising receiving additional content identification information.

21. The method of claim 20, wherein said additional content identification information comprises at least one of content title, ownership information, or origination information.

22. The method of claim 20, further comprising:
comparing at least one of said watermark value, said fingerprint or said additional content information against a database of registered watermark values, fingerprints and additional content identification information.

23. The method of claim 22, wherein said registering is completed when said comparing produces no matches.

24. The method of claim 22, wherein said registering is not completed when said comparing produces at least one match.

25. The method of claim 24, further comprising notifying at least one of an applicant for registration or a content owner.

26. The method of claim 22, wherein said registering is partially completed when said comparing produces at least one match.

27. The method of claim 26, further comprising:
contacting at least one of an applicant for registration or a content owner; and
updating said database in accordance with the response(s) of said applicant or said content owner.

28. A method for enabling identification of a received content comprising:
generating a fingerprint associated with said received content;
analyzing said received content to discern the presence of embedded watermarks; and
identifying said received content in accordance with a plurality of registered fingerprint and watermark values and by redundant utilization of both of said generated fingerprint and said analyzing, wherein:
at least one watermark value is detected as a result of said analyzing;
said identifying comprises comparing a detected watermark value with a database of registered watermark values;
if said detected watermark value matches a registered watermark value from said database of registered watermark values, said fingerprint is compared with a database of registered fingerprints; and
if said fingerprint matches a registered fingerprint from said database of registered fingerprints, a first identification information associated with said stored watermark value is compared with a second identification information associated with said fingerprint to assess a status of said received content.

29. The method of claim 28, wherein said identifying is based on additional information stored in a registration database.

30. The method of claim 28, wherein:
no watermarks are detected as a result of said analyzing;
said identifying comprises comparing said fingerprint with a database of registered fingerprints; and
if no matches are discovered, reporting the reception of an unregistered content.

31. The method of claim 28, wherein:
at least one watermark value is detected as a result of said analyzing; and
the detected watermark value and said fingerprint are combined to uniquely identify said received content.

32. The method of claim 28, wherein an agreement between said first and second identification information indicates the reception of a properly registered content.

33. The method of claim 28, wherein a report is issued in the event of a conflict between said first and second identification information.

34. The method of claim 28, wherein a conflict between said first and second identification information indicates the reception of an improperly registered content or an altered content.

35. The method of claim 28, wherein cryptographic techniques are employed to ensure secure communications with said database.

* * * * *

UNITED STATES PATENT AND TRADEMARK OFFICE
CERTIFICATE OF CORRECTION

| | | |
|---|---|---|
| PATENT NO. | : 8,601,504 B2 | Page 1 of 1 |
| APPLICATION NO. | : 10/600081 | |
| DATED | : December 3, 2013 | |
| INVENTOR(S) | : Chris L. Stone et al. | |

It is certified that error appears in the above-identified patent and that said Letters Patent is hereby corrected as shown below:

IN THE DRAWINGS

In Fig. 1, Sheet 1 of 4, for Tag "[006]", in Line 1, please delete "Studios,□" and insert -- Studios, --, therefor.

IN THE SPECIFICATION

In Column 6, Line 5, please delete "possiblity" and insert -- possibility --, therefor.

In Column 6, Line 32, please delete "fingerpint" and insert -- fingerprint --, therefor.

In Column 7, Line 29, please delete "organizatoons" and insert -- organizations --, therefor.

In Column 7, Line 45, please delete "Versign" and insert -- Verisign --, therefor.

In Column 7, Line 67, please delete "know" and insert -- known --, therefor.

In Column 8, Line 50, please delete "interate" and insert -- iterate --, therefor.

Signed and Sealed this
Third Day of June, 2014

Michelle K. Lee
*Deputy Director of the United States Patent and Trademark Office*